United States Patent [19]

Ehrenhaft et al.

[11] 4,057,345
[45] Nov. 8, 1977

[54] ADDITIVE LAMPHOUSE

[75] Inventors: Franz F. Ehrenhaft, Forest Hills; Seymour Rosin, Massapequa Park, both of N.Y.

[73] Assignee: Anamorphic Ltd., Forest Hills, N.Y.

[21] Appl. No.: 722,419

[22] Filed: Sept. 9, 1976

[51] Int. Cl.[2] .......................................... G03B 27/76
[52] U.S. Cl. ........................................ 355/35; 355/71
[58] Field of Search ................. 355/71, 77, 67, 68, 355/32, 35, 38, 60

[56] References Cited

U.S. PATENT DOCUMENTS

| | | | |
|---|---|---|---|
| 2,411,694 | 11/1946 | Place | 355/60 X |
| 3,229,569 | 1/1966 | Frost et al. | 355/38 |
| 3,482,914 | 12/1969 | Misener | 355/77 X |
| 3,510,221 | 5/1970 | Berman | 355/77 |
| 3,533,693 | 10/1970 | Balint | 355/71 |
| 3,640,619 | 2/1972 | Huber | 355/71 |
| 3,649,120 | 3/1972 | Pfeifer | 355/68 |
| 3,667,841 | 6/1972 | Ross | 355/32 |
| 3,818,216 | 6/1974 | Larraburu | 355/71X |

Primary Examiner—Donald A. Griffin
Attorney, Agent, or Firm—Michael J. Striker

[57] ABSTRACT

Three component beams are taken off three sides of a single filament light source, individually attenuated, colored in respective ones of the three additive primary colors red, blue and green and recombined to form three superimposed component images of the filament light source. The three superimposed images of the filament light source are positioned at the light source location for the printing camera. Adjacent the light source the three component beams pass through three apertures spaced from the source far enough to be located at a position where the light field is uniform. Three superimposed real images of these apertures are formed down-path of the superimposed images of the filament light source and coincident with the plane of the transparency to be printed. The three superimposed real images of the filament light source are first brought into exact register and then, independently thereof, the three superimposed real images of the aperture are brought into exact register, utilizing first and second independent adjustment expedients.

7 Claims, 6 Drawing Figures

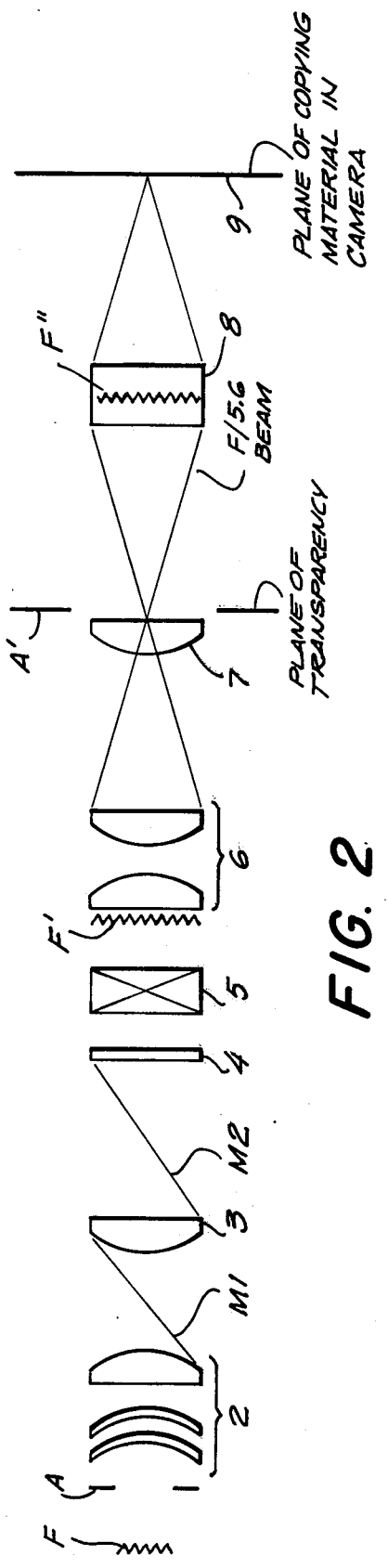
FIG. 2
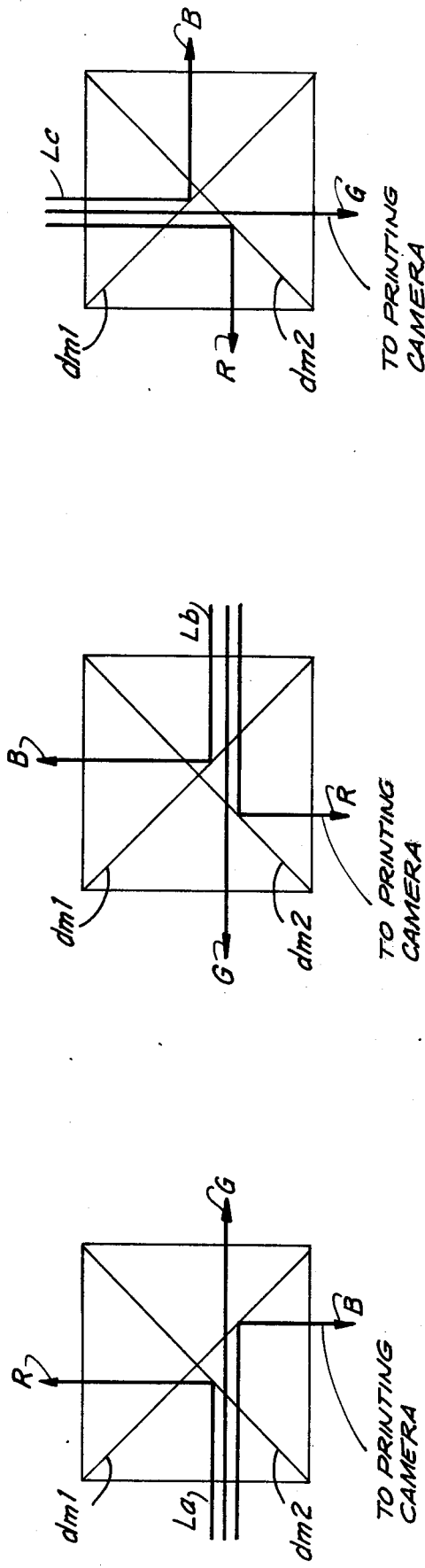
FIG. 3A
FIG. 3B
FIG. 3C

ADDITIVE LAMPHOUSE

BACKGROUND OF THE INVENTION

When using a light source to illuminate transparencies which are to be printed, it is often desirable to change the balance of the primary color components of the light from the source to achieve a desired color balance in the final print. When additive printing processes are employed, the primary colors utilized are red, blue and green. It is known to utilize three light sources, one for each primary color, to independently attenuate the light from these sources and then combine the component beams to form a beam of color compensated white light. It is also known to derive the color compensated white light from a single light source by splitting off individual primary color component beams one after the other proceeding along the optical path of the light, and individually attenuating each component beam.

The known lamphouses are characterized by various disadvantages relating to the efficiency of the utilization of the light from the source, the equality of the three component beams, and other factors.

SUMMARY OF THE INVENTION

It is the general object of the invention to provide an additive lamphouse which avoids the disadvantages of known constructions and which furthermore is of a basically different design.

This general object, and others which will become understandable upon a reading of the description, below, of preferred embodiments, can be met by utilizing a single light source, taking off three component beams from three different sides of the single light source, independently attenuating the three component beams, coloring the beams in the three additive primary colors red, blue and green and recombining the beams to form three superimposed primary color component real images of the light source. These superimposed images of the light source are then positioned relative to the printing camera at the location which would otherwise be occupied by a physical light source, so that the superimposed individually attenuated component images of the light source are used as the light source for the camera.

According to a further concept of the invention, each of the three component beams passes through a respective aperture located far enough away from the filament light source to be positioned at a location of uniform light field. Three superimposed images of the aperture are formed in the plane of the transparency to be printed, down-path of the three superimposed images of the light source. Thus, the light illuminating the transparency will be of uniform brightness.

Two distinct adjusting means are provided to effect exact registration of the superimposed filament light source images and to effect exact registration of the superimposed aperture images. The superimposed filament images can be brought into exact register independently of the superimposed aperture images, and vice versa.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

FIG. 2 is a straightened-out depiction of one of the three identical-length optical paths travelled by the three component beams of the lamphouse and associated printing camera;

FIGS. 3a-3c depict the optical element used for recombining the three component beams.

DESCRIPTION OF THE PREFERRED EMBODIMENTS

Figure 1:
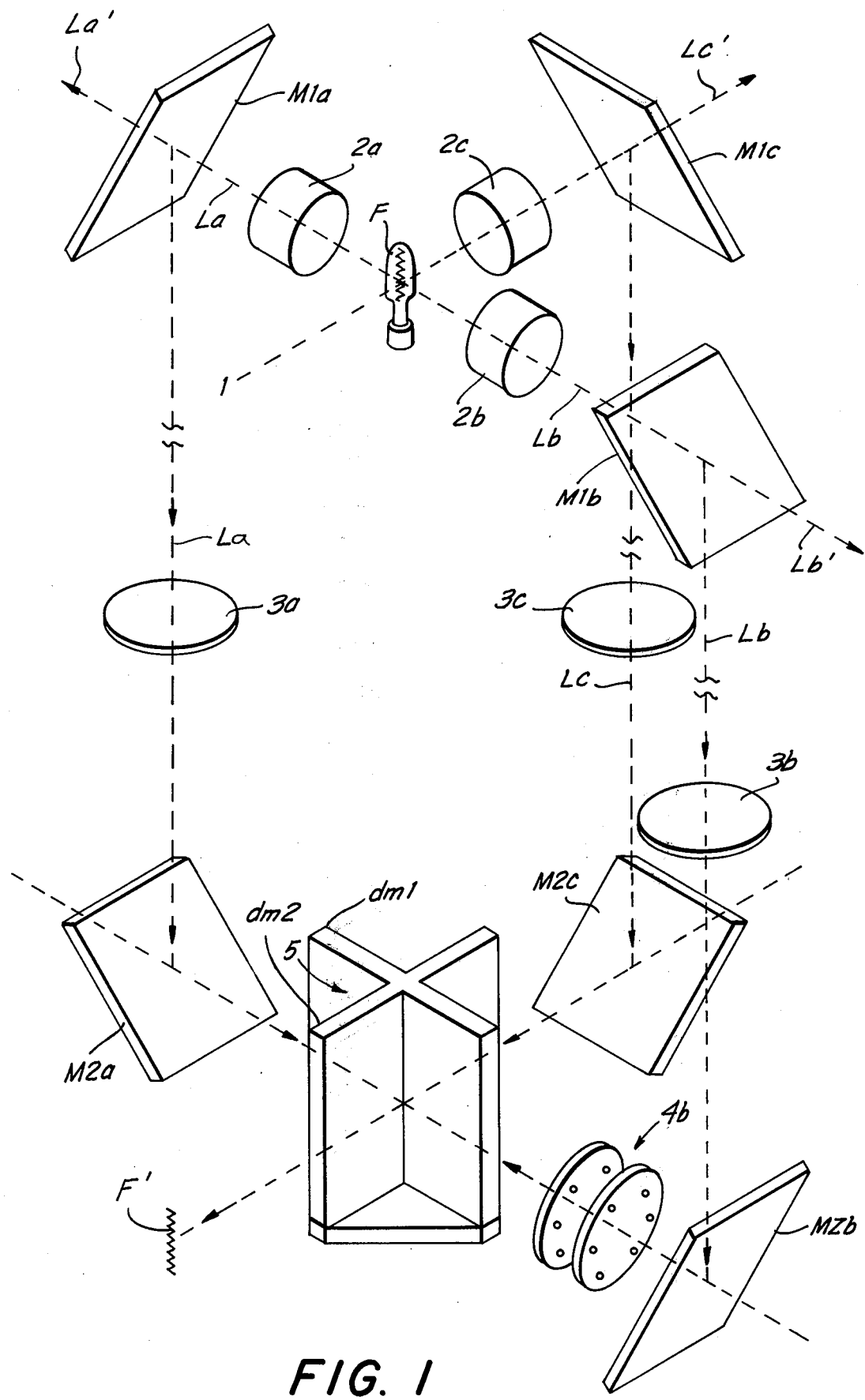
FIG. 1 is a schematic perspective illustration of an additive lamphouse according to the invention.

FIG. 1 schematically depicts the design of one exemplary lamphouse according to the present invention. Numeral 1 denotes a filament light source. Light is taken off from the filament light source 1 from three sides of the latter. To this end, there are provided three optics 2a, 2b, 2c located to three sides of the filament light source 1, for projecting three light beams from the light source 1 to respective ones of three first deflecting mirrors M1a, M1b, M1c.

The optical axes of the optics 2a and 2b are colinear and perpendicular to the optical axis of optics 2c. In this embodiment, the filament F of light source 1 is vertically oriented, and the plane defined by the optical axes of optics 2a, 2b, 2c is horizontally disposed.

The three first deflecting mirrors M1a, M1b, M1c are so oriented as to receive the three component beams La, Lb, Lc being transmitted by optics 2a, 2b, 2c and deflect these component beams vertically downward, so that the portions of the component beams La, Lb, Lc located down-path of mirrors M1a, M1b, M1c extend parallel to one another.

The portions of the three optical paths for the component beams La, Lb, Lc located down-path of first mirrors M1a, M1b, M1c include respective optics 3a, 3b, 3c for projecting the three component beams to respective second deflecting mirrors M2a, M2b, M2c. These three deflecting mirrors are so oriented as to deflect the three component beams 2a, 2b 52c back to directions parallel to their original directions.

Down-path of the second deflecting mirrors M2a, M2b, M2c, the three component beams enter respective sides of an optical element 5 referred to herein as a cross. The cross 5 in a manner described below recombines the three component beams to form again a single beam now of color corrected light emerging from the fourth side of the cross.

Located in the portions of the three optical paths intermediate the second mirrors M2a, M2b, M2c and the cross 5 are three attenuators 4a, 4b, 4c, of which only 4b is depicted, for the sake of simplicity. In the illustrated embodiment, the attenuator 4b is comprised of two neutral gray filter disks calibrated in 0.1 and 1.0 density units to make possible the selection of 100 different density value combinations.

The manner in which the three component beams are colored in the three primary colors red, blue and green will now be explained.

As the preferred possibility, the first deflecting mirrors M1a, M1b, M1c are dichroic mirrors each of which reflects only the respective one of the three primary colors and transmits the other wavelengths, including infrared. In that event, the three component light beams L*a*, L*b*, L*c* would be white up-path of the first mirrors M1*a*, M1*b*, M1*c* and would be of respective primary colors red, blue and green down-path of those mirrors, with the transmitted portions L*a'*, L*b'*, L*c'* of the component beams including the unwanted color components, including the heat-generating infrared component disappearing through the mirrors.

If the first mirrors M1*a*, M1*b*, M1*c* are selectively reflective, then the second mirrors M2*a*, M2*b*, M2*c* need not be selectively reflective; however, it may be desired to make these mirrors selectively reflective as well, in order to further improve the quality of the color filtering action. Likewise, the attenuators 4*a*, 4*b*, 4*c* need only attenuate and not color, so that they may be neutral gray filters. If it is desired, however, these could be color filter sets, to further improve the quality of the color filtering action.

The three independently attenuated component beams L*a*, L*b*, L*c*, of the three primary colors red, blue and green, are recombined by the cross 5 and emerge from the fourth side of the cross as a beam of color corrected light. The action of the cross 5 is described below.

In the preferred embodiment, the coloring is effected by use of the selectively reflective dichroic mirrors M1. However, the coloring could, as an alternative, be effected exclusively by the cross 5 itself, due to the manner in which the cross 5 effects the recombination of the three component beams into the single color corrected beams.

FIGS. 3*a*-3*c* respectively show the effect of the cross 5 upon a beam of white light entering from the left, from the right, and from the back.

FIG. 3*a* shows the cross 5 as seen from above. The cross 5 is essentially comprised of two dichroic mirrors *dm*1, *dm*2 which intersect at an angle of 90° and which are each oriented at an angle of 45° to the optical axes of the incident beams. Dichroic mirror *dm*1 reflects blue only, and transmits other colors. Dichroic mirror *dm*2 reflects red only, and transmits other colors.

In FIG. 3*a* a beam of white light enters the cross 5 from the left. This corresponds to component beam L*a* in FIG. 1. The green component of the beam L*a* passes through both dichroic mirrors *dm*1, *dm*2. The blue component is reflected by mirror *dm*1 toward the printing camera. The red component is reflected by mirror *dm*2 away from the printing camera and becomes lost.

In FIG. 3*b* a beam of white light enters the cross 5 from the right. This corresponds to beam L*b* in FIG. 1. The green component, as always, passes through both dichroic mirrors *dm*1, *dm*2. The red component is reflected by mirror *dm*2 toward the printing camera. The blue component is reflected by mirror *dm*1 away from the printing camera.

In FIG. 3*c* a beam of white light enters the cross 5 from behind. This corresponds to beam L*c* in FIG. 1. The green component, as always, passes through both dichroic mirrors *dm*1, *dm*2, but now because of its entrance direction continues on to the printing camera. The blue component is reflected by mirror *dm*1 to the right. The red component is reflected by mirror *dm*2 to the left.

A comparison of FIGS. 3*a*-3*c* indicates that the blue, red and green light emitted toward the printing camera (upward in FIGS. 3*a*-3*c*) originates from the light entering respective ones of the three other sides of the cross 5. Consequently, by independently attenuating three component beams L*a*, L*b*, L*c* of white light, it is possible to affect the color balance of the light entering the printing camera without making mirrors M1 or M2 or the use of attenuators 4 color selective. However, as indicated above, in the preferred embodiment of the invention, the color filtering effect of the cross 5 is merely used to improve the color purity of the component beams, and the cross 5 is principally used to recombine the differently colored component beams.

When the cross 5 is used merely to recombine the three differently colored component beams L*a*, L*b*, L*c*, the action of the mirrors *dm*1, *dm*2 is basically the same as shown in FIGS. 3*a*-3*c*. The blue light (L*a*) enters from the left and is reflected toward the printing camera. The red light (L*b*) enters from the right and is reflected toward the printing camera. The green light (L*c*) enters from behind and is transmitted toward the printing camera.

Further details of the optical system will be explained with reference to FIG. 2, which depicts one of the three optical paths, straightened out for pictorial purposes.

The shape of the filament F of the light source 1 makes for a non-uniform light field close to the filament F. Thus, if a white screen were placed quite close to the filament F, the coils of the filament would be apparent in the light field cast upon the screen. However, if such a screen were moved away from the filament F a certain distance, the white light on the filament would become entirely uniform. The aperture A of the optics 2 is located at such a distance from the filament F that the light field there is of uniform brightness.

The light passing through optics 2 is reflected as described above by first mirror M1, is projected by optics 3, here a planoconvex condenser lens, is reflected by second mirror M2, attenuated by attenuator 4 and then deflected or transmitted, as the case may be, by the cross 5.

There is formed down-path of the cross 5 a real image F' of the filament, magnified by way of example 5.6 ×. This real image F' is of one of the three primary colors red, blue and green and has a brightness dependent upon the setting of the attenuator 4.

Meanwhile, the image of the aperture A of the optics 2 has been brought fourth at a controlled magnification to suit the size of the transparencies to be located at that position. The light field at A' is of uniform brightness, just as was the light field at A. The light image A' coincides with the plane of the transparency to be printed. A field lens stage 6 cooperates with the other optics to form from the aperture A the image A'. The image F'' of the filament image F' is projected into the printing lens 8 by field lens 7 of the printing camera, and the printing lens 8 projects the image of the illuminated transparency onto the plane of the copying material 9 in the printing camera.

In FIG. 2 the combination of the filament image F' and the aperture image A' constitutes the equivalent of the actual filament F and aperture A, but magnified and in free space. The brightness of the images F' and A' has been set to the desired value by means of the attenuator 4.

It will be understood that the optical train of FIG. 2 shows only one of the three partly overlapping optical paths. Accordingly, it is to be understood that three filament images F' and three aperture images A' are formed. Ideally, the three filament images F' will be in exact register, as will also the three aperture images A'. However, in practice, the problem of exact registration is extremely troublesome.

Each aperture image A' is essentially a circle of light in one of the primary colors red, blue and green. If the three aperture images A' are not in register, then the light at the plane of the transparency will be white only where all three aperture images A' overlap. The light will be red, blue or green where a portion of one of the images overlaps neither of the other images, and will be of a combined color where a portion of one of the images overlaps only one but not both of the other images. Consequently, it is necessary to bring the three colored light circles A' into exact register.

However, this is not the only condition which must be met. Even if the three aperture images A' are in perfect register, but the three filament images F' are not, other problems may result. The cones of light being received by the printing lens 8 will not exactly coincide with one another. If the aperture of the printing lens is too small, as a result of being deliberately reduced or otherwise, to receive the non-coincident three cones of light, light from one or more of the cones will not be received, resulting in non-uniform color in the light projected by the printing lens 8.

Figure 4:
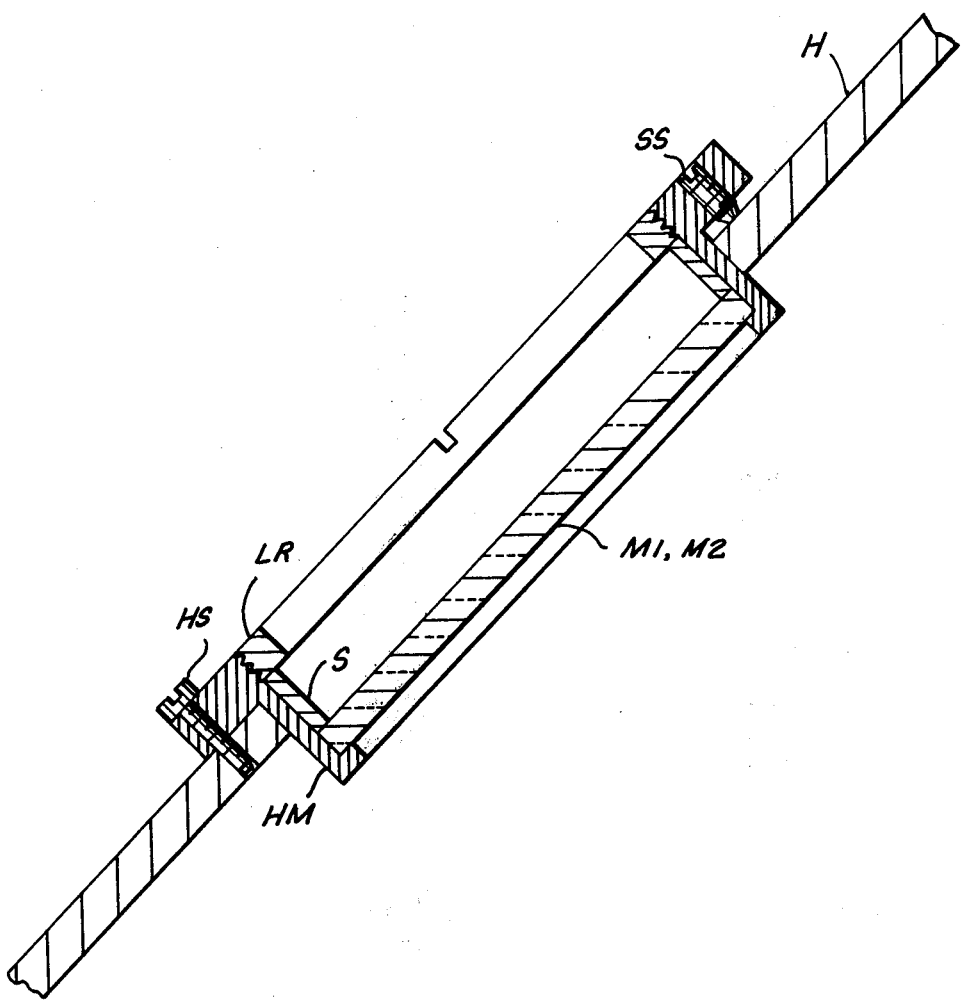
FIG. 4 depicts the manner in which the deflecting mirrors of the construction of FIG. 1 are actually mounted for adjustment.

The registering of the filament images F' and the aperture images A' is effected by adjusting the orientation of the first mirrors M1 and the second mirrors M2. Each of the mirrors M1, M2 is mounted as shown in FIG. 4 on a wall of the housing of the lamphouse. Each such mirror is circular and is held within a holding member HM against the radially inwardly extending flange thereof by a sleeve S. The sleeve S in turn is held in place by a screwthreaded ring LR. The entire assembly is mounted on the lamphouse housing H by means of three equiangularly spaced set screws SS and three equiangularly spaced holding screws HS. The leading ends of the holding screws HS are screwed into threaded holes in housing H, whereas the leading ends of the set screws merely rest against the surface of housing H. The holding screws HS serve to prevent the mirror unit from falling off the housing H, whereas the three equiangularly spaced set screws SS together serve to determine the angular orientation of the mirror unit.

To effect an adjustment of the angular orientation of one such mirror unit, the three holding screws HS are first of all unscrewed, so that the mirror unit is no longer fastened to the housing H. The three set screws SS are then advanced or retracted to change the orientation of the mirror unit. Thereafter, the holding screws HS are screwed into the housing H again and tightened.

Referring again to FIG. 2, the process of registering the filament images F' with one another and the aperture images A' with one another proceeds as follows.

First, the filament images F' are registered by adjusting the first mirrors M1a, M1b, M1c. Although both the first mirrors M1 and the second mirrors M2 are adjustable, the first mirrors M1 exert upon the filament images F' a much greater optical leverage than do the second mirrors M2. Indeed, it will usually be unnecessary to adjust the mirrors M2 at all in the course of effecting registration of the filament images F'.

After the filament images F' have been brought into register, the aperture images A' are registered by adjusting the second mirrors M2a, M2b, M2c. Because these second mirrors exert only very little optical leverage upon the filament images F', the registering of the aperture images A' by adjustment of the second mirrors M2 will usually not disturb the registering of the filament images F' which have previously been effected. However, because the optical leverage exerted by first mirrors M1 upon aperture image A' is greater than that exerted by second mirrors M2, it is necessary to effect registration of the filament images F' before effecting registration of the aperture images A'.

It may happen, particularly for example when initially setting up the apparatus, that the lack of registration of the filament images F' with one another and that of the aperture images A' with one another is very great. In that event, after the filament images F' have been brought into register, the adjustment of second mirrors M2 required to bring the aperture images A' into register may cause the filament images F' to move out of register again. If that occurs, it is merely necessary to once again adjust the first mirrors M1 to bring the filament images F' into register, and thereafter once again adjust the second mirrors M2 to bring the filament images A' into register.

It is to be emphasized that the registering of the filament images F' is to be considered independent of the registering of the aperture images A'. In the first place, because the optical leverage exerted by second mirrors M2 on the filament images F' is small, it will often be possible to simply bring the F' images into register using mirrors M1, and then simply bring the A' images into register using mirrors M2. In that sense, the F' and A' images can be brought into register independently of each other.

However, even where repeated registering of the F' and then the A' images proves necessary, each registering step still involves registering the F' images independently of the A' images, and vice versa.

The independent registerability of the F' images and the A' images is a feature of very great practical importance. If this independent registerability were not present, the trial-and-error work involved in bringing the F' images into register and simultaneously the A' images into register would be extremely tedious. Accordingly, the use of the two sets of adjustable mirrors M1 and M2, and the introduction of two degrees of freedom into the adjustability of the F' and A' images, is very important in facilitating use of the apparatus.

The illustrated optical system must fulfill a further condition, namely, it must cover the acceptance angle of the printing lens 8 of the printing camera. The collector lens close to the filament F should have a large cone angle to accept as much light as possible from the filament. However, the acceptance angle of the printing lens is smaller and the light cone must be squeezed down to a smaller cone, and doing this involves magnification of the filament image. In the illustrated embodiment, the printing lens 8 of the camera requires an F/5.6 beam, and accordingly the filament image F' is magnified 5.6 × relative to the filament F.

The three superimposed filament images F' and the three superimposed aperture images A' constitute the color corrected equivalent of the filament image F and the aperture A, so that the superimposed real images F' can be considered to constitute the color corrected light source of the printing camera.

It is to be noted that if the F' and A' images are to be brought into exact register, the three optical paths for the three component beams must be of similar or identical length. In the illustrated embodiment, this involves positioning the planoconvex condenser lens 3 for the green path closer and that for the blue path farther from the respective first mirror M1 than that for the red path. Alternatively, the curvatures of the three condenser lenses 3 for the three paths could differ from one another in an optically equivalent manner.

It will be understood that each of the elements described above, or two or more together, may also find a useful application in other types of constructions differing from the types described above.

While the invention has been illustrated and described as embodied in a lamphouse utilizing a particular geometry, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. An arrangement for providing color compensated light, comprising, in combination, a single filament light source; means for deriving from the single filament light source three component beams and for transmitting those beams along three optical paths, including three light take-off means located at three different sides of the light source; and means located in the three optical paths for attenuating the three component beams independently of one another, for coloring the three beams in the primary colors red, blue and green and for recombining the beams into a single beam of color compensated light, the means for attenuating, coloring and recombining comprising three attenuating means and a coloring means for coloring the three component beams in respective ones of the three primary colors red, green and blue, each of the three optical paths including one of the three attenuating means, with the attenuating means being located up-path of the coloring means, the coloring means being an optical element which both colors the three component beams in respective ones of the three primary colors red, green and blue and recombines the thusly colored component beams to form the single beam of color corrected light, the three optical paths at the portions thereof down-path of the three attenuating means extending in respective ones of three different directions, the first and second directions being opposite to each other, and the third direction being perpendicular to the first and second directions, the optical element being comprised of two dichroic mirrors, the two dichroic mirrors intersecting each other at an angle of 90°, each dichroic mirror standing in a plane which is oriented at an angle of 45° to each of said first, second and third directions, one dichroic mirror transmitting only light of a first one of the three primary colors red, blue and green, the other dichroic mirror transmitting only light of a different second one of the three primary colors red, blue and green, the portions of the three optical paths located down-path of said optical element being coincident with one another.

2. An arrangement for providing color compensated light, comprising, in combination, a single filament light source; means for deriving from the single filament light source three component beams and for transmitting those beams along three optical paths, including three light take-off means located at three different sides of the light source; and means located in the three optical paths for attenuating the three component beams independently of one another, for coloring the three beams in the primary colors red, blue and green and for recombining the beams into a single beam of color compensated light, further including a printing camera for forming upon copying material located in the camera in a predetermined plane a real image of a transparency located in another predetermined plane with the transparency being illuminated by a light source occupying a predetermined position relative to the camera, the predetermined position being located down-path of the recombining means, the means for deriving, transmitting, attenuating, coloring and recombining the three component beams including three means, one in each of the three optical paths, for forming in register with one another at said predetermined position relative to the camera three superimposed real images of the filament light source in the three primary colors red, blue and green, whereby the superimposed real images of the filament light source serve as a color compensating light source for the printing camera, the means for deriving, transmitting, attenuating, coloring and recombining the three component beams including three means, one in each of the three optical paths, each defining an aperture through which the respective component beam passes, and three means, one in each of the three optical paths, for forming in register with one another in the plane of the transparency to be illuminated three superimposed real images of the aperture in the three primary colors red, blue and green, the means for deriving, transmitting, attenuating, coloring and recombining the three component beams including first adjusting means for adjusting the positions of the three real images of the filament light source independently of one another and second adjusting means for adjusting the positions of the three real images of the aperture independently of one another and independently of the three real images of the filament light source.

3. The arrangement defined in claim 2, the optical leverage exerted by the first adjusting means upon the images of the aperture being greater than that exerted by the first adjusting means upon the images of the filament light source, so that when the first adjusting means are adjusted to exactly register the superimposed images of the filament light source the images of the aperture will tend to move out of register with one another, the optical leverage exerted by the second adjusting means upon the images of the filament light source being much less than that exerted by the second adjusting means upon the images of the aperture, so that when the second adjusting means are adjusted to exactly register the superimposed images of the aperture after the first adjusting means have been adjusted to exactly register the superimposed images of the filament light source the exact register of the images of the filament light source will be substantially undisturbed.

4. The arrangement defined in claim 3, the arrangement including three optics located to three sides of the filament light source and constituting the three light take-off means, the optical axes of two of the optics being colinear and that of the third being perpendicular thereto, each of the three optics having an aperture constituting a respective one of said three apertures, the first adjusting means comprising three first deflecting mirrors located down-path of the three optics and each oriented to deflect the respective component beam in such a direction that the three component beams travel parallel to each other down-path of the first deflecting mirrors, the second adjusting means comprising three second deflecting mirrors located down-path of the three first deflecting mirrors and each oriented to deflect the respective component beam in such a direction that the beam travels parallel but opposite to the direction of its travel up-path of the respective first deflecting mirror, the means for deriving, transmitting, attenuating, coloring and recombining furthermore including a cross located down-path of the three second deflecting mirrors, the cross being comprised of two selectively reflective mirrors intersecting perpendicular to each other and each oriented at an angle of 45° to the portions of the three component beams located down-path of the second deflecting mirrors, one of the selectively reflective mirrors reflecting only one of the three primary colors red, blue and green and the other reflecting only one different one of the three primary colors red, blue and green, the component beams reflected by the three second deflecting mirrors entering into respective ones of the three sides of the cross and emerging from the fourth side and passing into the printing camera, the attenuating means including three attenuators each located in one of the three optical paths intermediate the second deflecting mirror and the cross.

5. The arrangement defined in claim 4, the means for deriving, transmitting, attenuating, coloring and recombining the three component beams furthermore including a field lens stage located generally coincident with the three superimposed images of the filament light source for forming at the plane of the transparency the three superimposed images of the aperture, the arrangement furthermore including a field lens stage at the plane of the transparency for projecting into the printing lens of the printing camera an image of the three superimposed real images of the filament light source.

6. The arrangement defined in claim 5, the first deflecting mirrors each reflecting only a single respective one of the three primary colors red, blue and green, the means for deriving, transmitting, attenuating, coloring and recombining the three component beams including three condenser lenses each arranged in one of the three optical paths intermediate the first and second mirrors, the condenser lens in the green path being closer to and that in the blue path being farther from the respective first deflecting mirror than that in the red path.

7. The arrangement defined in claim 5, the first deflecting mirrors each reflecting only a single respective one of the three primary colors red, blue and green, the means for deriving, transmitting, attenuating, coloring and recombining the three component beams including three condenser lenses each arranged in one of the three optical paths intermediate the first and second mirrors, the curvatures of the three condenser lenses being different to compensate for the differences in path length attributable to the different wavelengths of the light of the three component beams.

* * * * *